United States Patent [19]
Morisaki et al.

[11] Patent Number: 5,282,096
[45] Date of Patent: Jan. 25, 1994

[54] MAGNETIC RECORDING AND PLAYBACK APPARATUS

[75] Inventors: Kazuhiko Morisaki, Yokohama; Atsushi Hayami, Yamato; Hiroshi Nakagawa, Yokosuka, all of Japan

[73] Assignee: Victor Company of Japan, Ltd., Yokohama, Japan

[21] Appl. No.: 966,564

[22] Filed: Oct. 26, 1992

Related U.S. Application Data

[63] Continuation of Ser. No. 505,420, Apr. 6, 1990, abandoned, which is a continuation-in-part of Ser. No. 311,067, Feb. 16, 1989, Pat. No. 5,023,731.

[30] Foreign Application Priority Data

Apr. 7, 1989 [JP] Japan .................. 1-87000

[51] Int. Cl.$^5$ .................. G11B 15/14; G11B 27/02
[52] U.S. Cl. .................. 360/64; 360/13
[58] Field of Search .................. 360/64, 13, 77.13, 32

[56] References Cited

U.S. PATENT DOCUMENTS

| | | | |
|---|---|---|---|
| 4,507,688 | 3/1985 | Fujiki et al. | 360/13 |
| 4,591,924 | 5/1986 | Miura et al. | 360/64 |
| 4,628,373 | 12/1986 | Takahashi et al. | 360/64 |
| 4,669,002 | 5/1987 | Nishioka et al. | 360/64 |
| 4,761,693 | 8/1988 | Higashi et al. | 360/13 |
| 4,768,106 | 8/1988 | Ito et al. | 360/64 |

FOREIGN PATENT DOCUMENTS

| | | |
|---|---|---|
| 61-107506 | 5/1986 | Japan . |
| 2103866 | 2/1983 | United Kingdom . |
| 2167889 | 6/1986 | United Kingdom . |

Primary Examiner—Donald Hajec
Assistant Examiner—Won Tae C. Kim
Attorney, Agent, or Firm—Jacobson, Price, Holman & Stern

[57] ABSTRACT

A rotary head type magnetic recording and playback apparatus for performing an after recording only to a desired signal area by using a head (1,3) 2,4) having a core width broader than the track width (Tp) of a recorded tape (7), wherein recording heads (1,3) and playback heads (2,4) are provided at every channel (A,B), respectively, the respective heads are arranged at angular intervals of 90 degrees so that the playback heads precede the recording heads in the rotational direction (FC) of a rotary drum (8,9) in a plane of rotation thereof, and the respective heads are offset in the axial direction of the rotational axis of the rotary drum so that the lower edge (R) of each recording head traces the boundary portion between the tracks and the centers of the playback heads trace the central portion of the tracks.

1 Claim, 5 Drawing Sheets

MAGNETIC RECORDING AND PLAYBACK APPARATUS

CROSS-REFERENCE TO RELATED APPLICATION

This is a continuation of application Ser. No. 07/505,420, filed Apr. 6, 1990, which was abandoned upon the filing hereof; which in turn is a continuation-in-part of application Ser. No. 07/311,067, filed Feb. 16, 1989, now U.S. Pat. No. 5,023,731.

BACKGROUND OF THE INVENTION

The present invention relates to a rotary head type magnetic recording and playback apparatus such as a digital audio tape-recorder (DAT), and more particularly relates to an improvement in a rotary head type magnetic recording and playback apparatus adapted to implement an after recording (hereinafter referred to as a "postrecording") to a recorded magnetic tape.

There is generally known a helical scan type magnetic recording and playback apparatus called a DAT constituted to sequentially record pulse code modulated audio signals on a magnetic tape by means of a plurality of rotary magnetic heads.

With DAT, PCM signals obtained by applying pulse code modulation to information to be recorded are recorded on a tape conforming to an Industry Standard. After such PCM signals are subjected to recording signal processing such as time compression, they are recorded while obliquely forming signal tracks on a magnetic tape by means of rotating two magnetic heads without a guard band being formed between tracks.

In the utilized two heads type DAT, the two heads in the recording are such that a head for A channel of plus (+) azimuth (A head) and a head for B channel of minus (−) azimuth (B head) are mounted or affixed and arranged on the rotary drum so as to form an angular interval of 180 degrees to each other. These heads are used in common for recording and playback. Each head gap width (hw) is 1.5 times the track pitch (Tp).

As shown in FIG. 1, the head for common use in recording and playback rotates in a direction indicated by an arrow FA with respect to the magnetic tape 7 transported in a direction indicated by an arrow T. Thus, recording of desired data is obliquely made on the magnetic tape 7. The signal format on the recorded track 32 is constituted as well known. This signal format includes a PCM area 32A where principally audio data is recorded, ATF (Auto Track Finding) areas 32B where signals for conducting a tracking servo are recorded, and sub code (SUB) areas 32C where time codes, etc. are recorded.

In such a DAT, postrecording is conducted as follows. Initially, ATF signals in the ATF areas 32B recorded on the tape 7 are reproduced or played back by the recording and playback common head. Thus, tracking is carried out on the basis of the reproduced signals.

In the case of tracking at the time of ordinary playback, as indicated by the position PA in FIG. 2, the center of the head 35 traces the central portion of the track 32. At the time of postrecording, however, as indicated by the position PB in the figure so that the lower edge Q of the head 35 becomes close to the boundary line of the track 32.

In the case of subcode postrecording, only when the head 35 scans the subcode areas 32C of the track 32, the head 35 is placed in a recording mode. Thus, a desired postrecording is conducted.

As stated above, since there is used a set of recording and playback common head for respective A and B channels each having a core width larger than the track width in the conventional DAT, it is necessary for performing a postrecording to conduct an offset tracking.

However, since tracking of the DAT is carried out by using pilot signals of ATF on tracks adjacent to both sides of a track subjected to tracking, it is necessary to allow the head to be positioned slightly on both adjacent tracks. Accordingly, as shown in FIG. 2, it is difficult to provide an offset such that the lower edge Q of the head 35 is positioned on the boundary line of the track.

For this reason, a track pattern after postrecording would be a pattern deviating somewhat from an original or normal pattern. For example, in the case of PCM postrecording, a deviation would occur within the PCM areas in the track, and in the case of SUB postrecording, a deviation would occur within the SUB areas in the track. Such a deviation in the pattern might cause disturbance of tracking at the time of playback, resulting in fluctuations in the playback signal level.

SUMMARY OF THE INVENTION

The present invention was made to overcome the above problems, and an object of the present invention is to provide a rotary head type magnetic recording and playback apparatus which is adapted to reduce the degree of diversity of the recording patterns before and after postrecording, thus making it possible to conduct the satisfactory playback of signals free from disturbance in tracking.

In order to achieve the above object, the present invention provides a rotary head type magnetic recording and playback apparatus in which postrecording is implemented only to a desired signal area of a recorded tape which is transported in a direction by means of a head having a core width broader than a track width of the recorded tape, characterized in that recording heads and playback heads are provided at every channel, respectively; that, in a plane of rotation of a rotary drum, respective heads are arranged at an angular interval of 90 degrees so that the playback heads precede the recording heads in the rotational direction; and that, in a direction of the rotation axis of the rotary drum, respective heads are arranged so that each edge (downstream side edge) of the recording heads on the downstream side of the tape transported traces the boundary portion between tracks with the centers of the playback heads tracing the central portions of the track.

In accordance with the present invention, tracking of the playback heads is carried out in an ordinary manner even at the time of postrecording. Thus, each playback head traces the central portion of the track. However, tracking of the recording head at this time is carried out so that the edge on the tape feeding side traces the portion on the boundary of the track.

For example, in the case of PCM postrecording, postrecording is implemented only to a PCM area of the track in accordance with a pattern larger than the track width. However, the track pattern corresponds with an ordinary pattern before postrecording by the postrecording implemented to the next adjacent track.

As described above, in accordance with this invention, the magnetic head is divided into playback magnetic heads and recording magnetic heads and the mounting positions on the drum of these heads are set so that the downstream side edges of the recording heads are positioned on the boundaries between tracks. Accordingly, the degree of diversity or disagreement between recording patterns before and after postrecording is reduced, thus making it possible to advantageously conduct a satisfactory playback of signals free from disturbance in tracking.

DETAILED DESCRIPTION OF THE PREFERRED EMBODIMENT

There will now be described in detail preferred embodiments of a magnetic recording and playback apparatus according to the present invention with reference to the accompanying drawings.

Figure 3A:
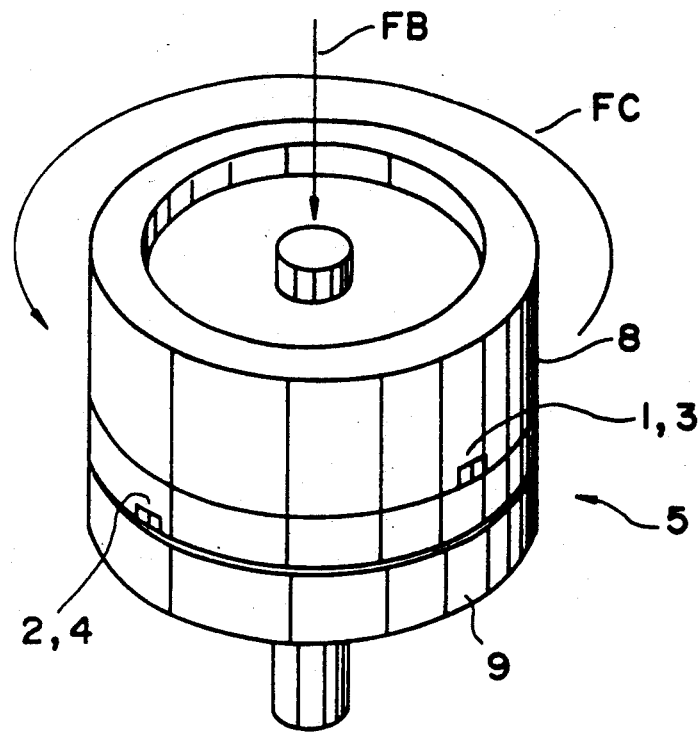
FIG. 3A is a perspective view of a head drum according to this invention.
Figure 3B:
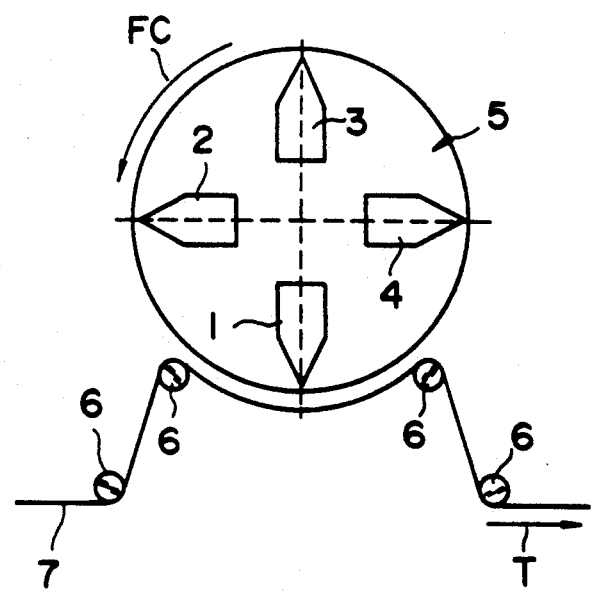

An embodiment of this invention is now described with reference to FIGS. 3 to 7. The same components as those in the aforementioned prior art, are designated by the same reference numerals, respectively. FIG. 3A is a perspective of the head drum, and FIG. 3B is a plan view which is viewed from an arrow FB (upper drum side) of FIG. 3A. In these figures, four heads are arranged at an angular interval of 90 degrees in a plane of rotation. In an order opposite to the rotational direction indicated by an arrow FC, an A channel recording head 1, a B channel playback head 2, a B channel recording head 3, and an A channel playback head 4 are arranged, respectively. The A channel recording head 1 has the same plus azimuth as the A channel playback head 4, and the B channel recording head 3 has the same minus azimuth as the B channel playback head 2. In the embodiment, each of the heads 1 through 4 has a gap width (track width) of 1.5 times the track pitch Tp.

Figure 1:
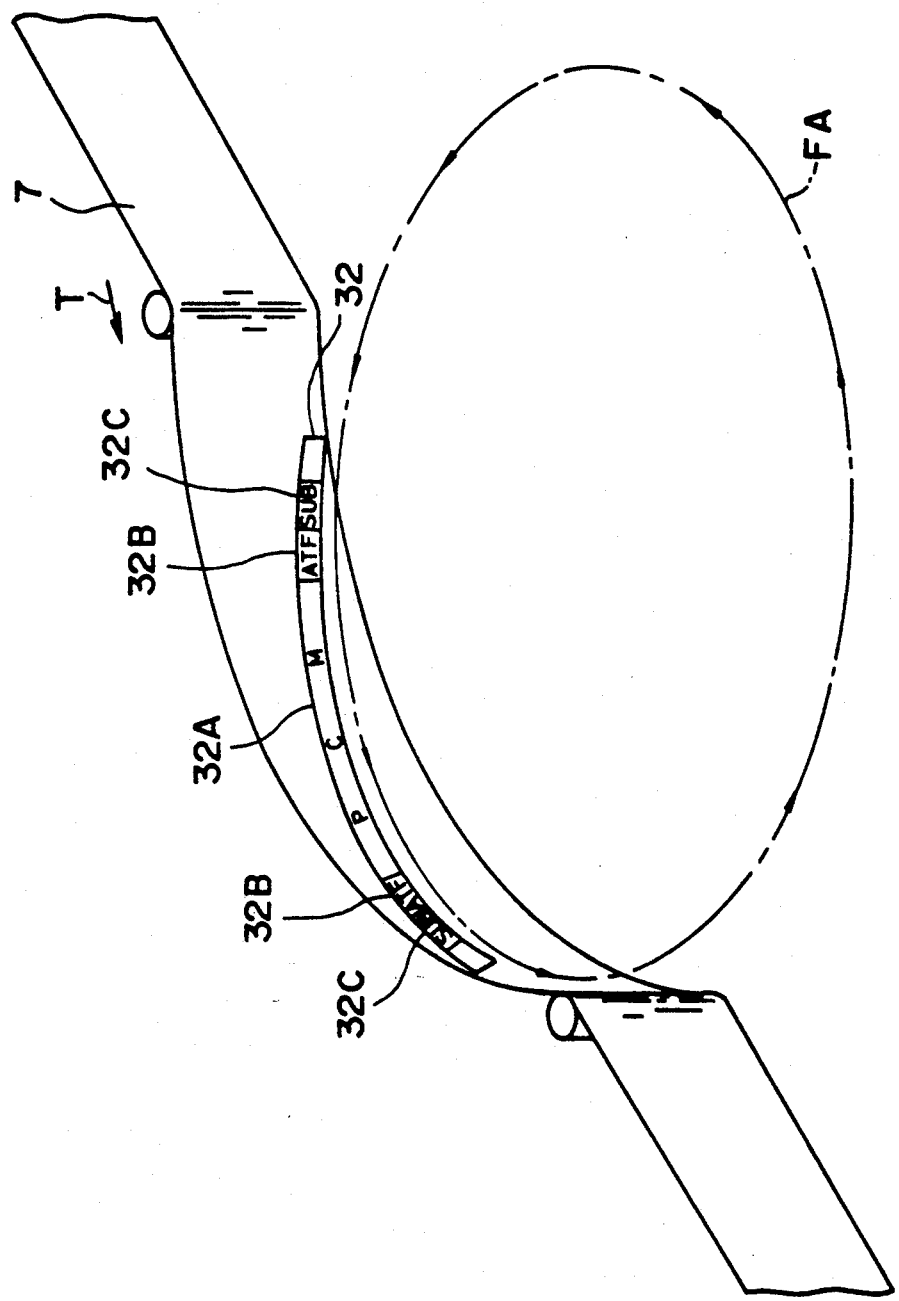
FIG. 1 is a schematic view showing a typical signal recording state by the rotary head.
Figure 2:
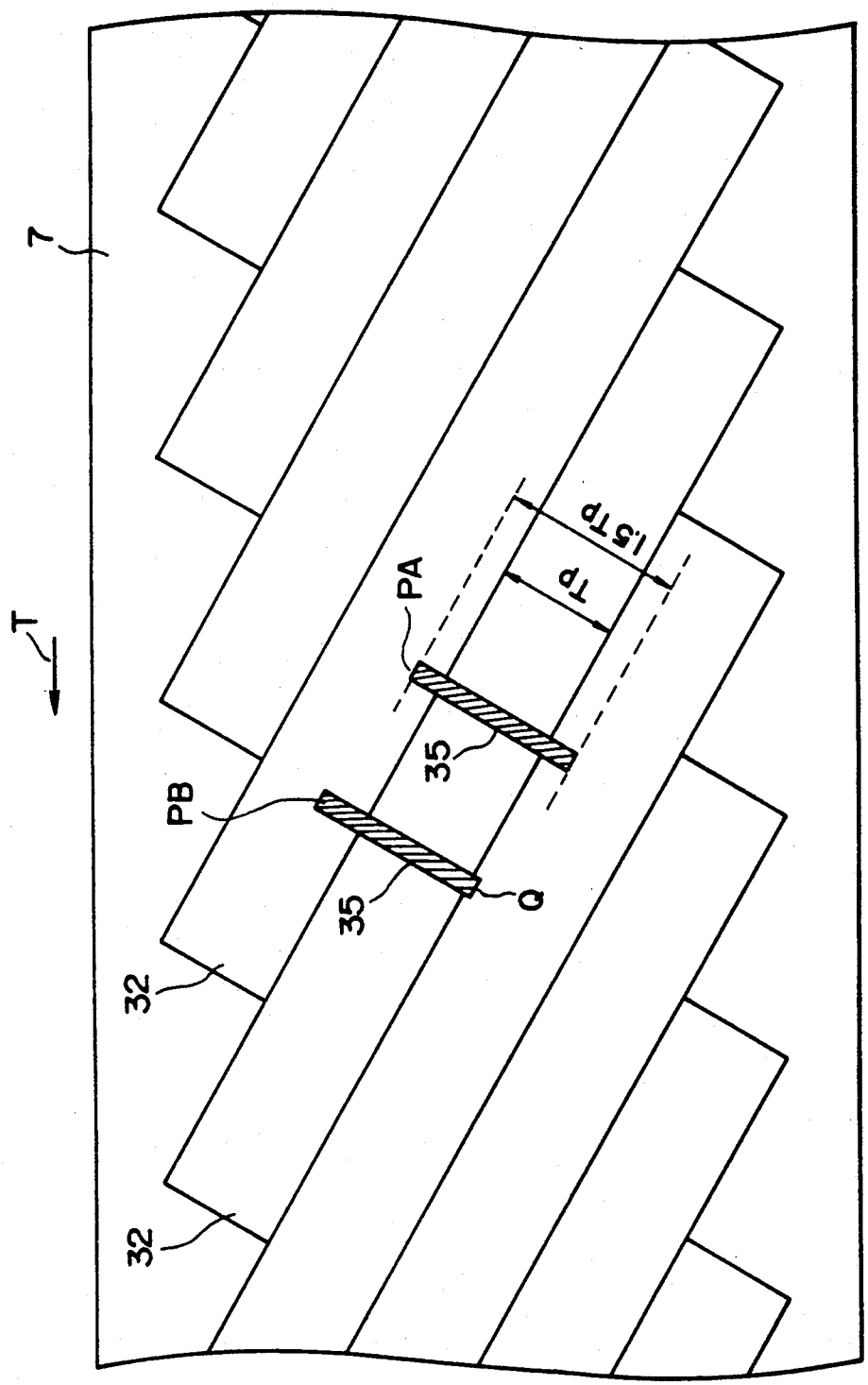
FIG. 2 is a schematic view showing the tracking state of a head in a conventional device.

As shown in FIG. 3A, the arrangement of respective heads with respect to the direction of the rotation axis of the upper drum 8 is such that the recording heads 1 and 3 and the playback heads 2 and 4 are arranged in manners different from each other. Namely, the playback heads 2 and 4 are arranged nearer to the lower drum 9 by (7/4) Tp than the recording heads 1 and 3. It is to be noted that Tp is a track width as aforementioned (see FIG. 2) wherein (7/4) Tp is 23.8 μm. As shown in FIG. 3B, magnetic tape 7 is obliquely wrapped around the head drum 5 over approximately 90 degrees, and transported in a direction indicated by an arrow T.

The signal processing circuit in this embodiment will now be described with reference to FIG. 4. In the figure, recording amplifiers 16 and 17 are connected to the recording signal input sides of the heads and 3, respectively. Furthermore, playback amplifiers 18 and 19 are connected to the playback signal output sides of the playback heads 2 and 4, respectively.

The signal input sides of the recording amplifiers 16 and 17 are both connected to the switching terminal side of the switch 13. The signal output sides of the playback amplifiers 18 and 19 are both connected to the switching terminal side of the switch 14. Switching of these switches 13 and 14 is carried out on the basis of a head switching signal outputted from a timing generator circuit 44. The signal input side of the switch 13 is connected to the signal output side of an AND gate 46. Furthermore, the signal output side of the switch 14 is connected to the input side of the timing generator circuit 44 through an ATF detection circuit 48.

A recording gate signal outputted from the timing generator circuit 44, is inputted to the aforementioned AND gate 46 together with an output from a modulation circuit 50. It is noted that the recording gate signal is inputted to the modulation circuit 50 together with postrecording data. Furthermore, a suitable clock for count is inputted from an external to the timing generator circuit 44.

The recording gate signal of the aforementioned signals is a signal as shown in FIGS. 5(b) and 5(c) with respect to a pattern of the track 32 shown in FIG. 5(a). This signal is generated by the timing generator circuit 44 using, as a reference, a sync signal of an ATF area 32B detected by the ATF detection circuit 48. The recording gate signal shown in FIG. 5(b) is a signal used in the case of the postrecording of the PCM area 32A in the track pattern. Furthermore, the recording gate signal shown in FIG. 5(c) is a signal used in the case of the postrecording of the SUB areas 32C, which signal serves to discriminate the subcode areas 32C in the track pattern.

Figure 6:
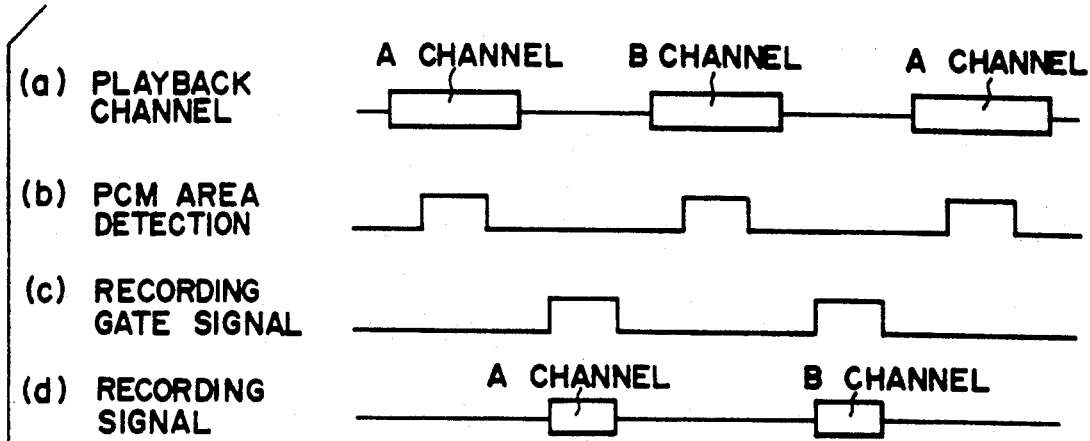
FIG. 6 is a time chart showing the operation of the signal processing circuit shown in FIG. 4.
Figure 7:
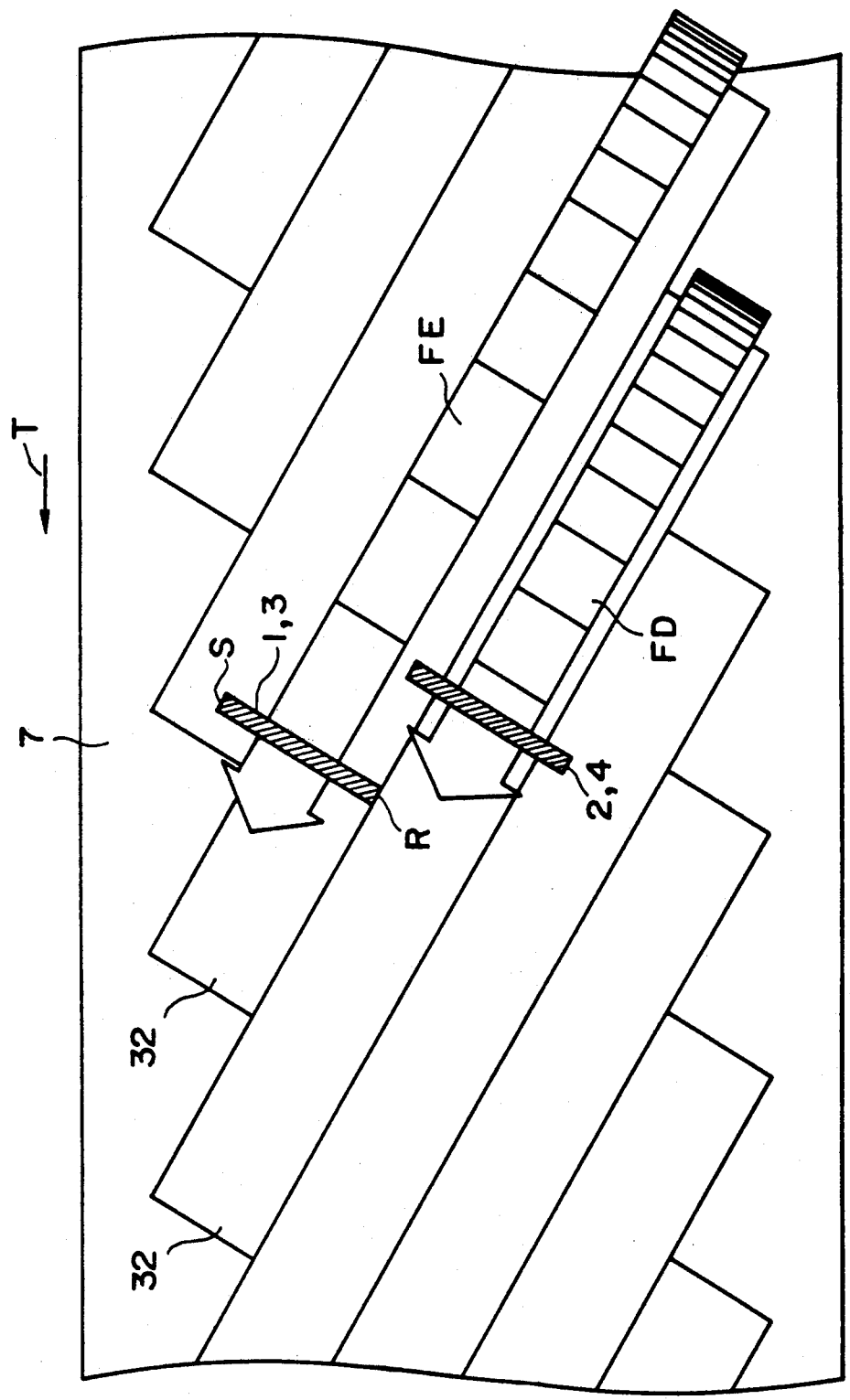
FIG. 7 is a schematic view showing the tracking state of the head in the preferred embodiment of this invention.

The operation at the time of the PCM postrecording of the above-mentioned embodiment will now be described with reference to FIGS. 6 and 7. In this case, playback operations of respective A and B channels are alternately carried out (see FIG. 6(a)). At this time, tracking of the playback heads 2 and 4 is conducted in an ordinary manner. Namely, as shown in FIG. 7, this tracking is conducted in a manner whereby centers of the playback heads 2 and 4 trace the central portions of the track 32 (in a direction indicated by an arrow FD).

A sync signal of the ATF area 32B is detected from a playback signal which is an output from the switch 14 by the ATF detection circuit 48. Thus, a signal for discriminating the PCM area as shown in FIG. 6(b) is generated on the basis of the sync signal. At the timing generator circuit 44, a recording gate signal indicating a postrecording in the PCM postrecording timing shown in FIG. 5(b) is generated on the basis of the discrimination signal (see FIG. 6(c)).

When this recording gate signal is inputted to the modulation circuit 50, a recording signal for a postrecording corresponding to the PCM area 32A in the above mentioned playback signal is modulated. The recording signal thus modulated is outputted to the AND gate 46. At the AND gate 46, an output of the recording signal inputted thereto is provided at a timing of the recording gate signal. This recording signal is inputted to the switch 13.

At the switch 13, switching is conducted on the basis of a control signal from the timing generator circuit 44. Thus, the recording signal is alternately delivered to the recording heads 1 and 3 at a timing shown in FIG. 6(d).

As shown in FIG. 7, the centers of the playback heads 2 and 4 trace the central portions of the tracks. This is because tracking is carried out by using pilot signals of ATF areas from the adjacent tracks. However, as shown in FIG. 3A, the recording heads 1 and 3 and the playback heads 2 and 4 are arranged in a manner that there is a difference of (7/4) Tp in height between the former heads and the latter heads. For this reason, as shown in FIG. 7, each tape feed side edge (which is on the downstream side of the tape transport) or each lower edge R of these recording heads 1 and 3, and each upper edge S thereof trace the boundary portion between tracks and the central portion of the adjacent track, respectively (see the arrow FE). Such a tracking by the recording heads 1 and 3 is repeatedly carried out as long as the centers of the playback heads 2 and 4 trace the central portions of the tracks in an ordinary manner.

Namely, postrecording is implemented to a track having a width of 1.5 times as large as an ordinary track width Tp by the recording heads 1 and 3. However, since over-write corresponding to 0.5 Tp is carried out by the postrecording applied to the next track, postrecording to a track having an ordinary width is eventually carried out. It is to be noted that, also in the case of the SUB postrecording, while the postrecording timing only varies as shown in FIG. 5(c), other operations are the same as in the above-mentioned operation.

In accordance with the aforementioned embodiment, there occurs no deviation or diversity in a width direction of the track between a recording track pattern before postrecording and a recording track pattern after postrecording. Namely, the recording pattern after postrecording becomes identical to an ordinary recording pattern. Accordingly, even if fluctuations of the playback head occur due to disturbances in the tracking at the time of playback after postrecording, a satisfactory reproduced or played back signal can be provided. Furthermore, since a circuit for conducting an offset tracking is unnecessary, the circuit arrangement can be simplified.

Figure 4:
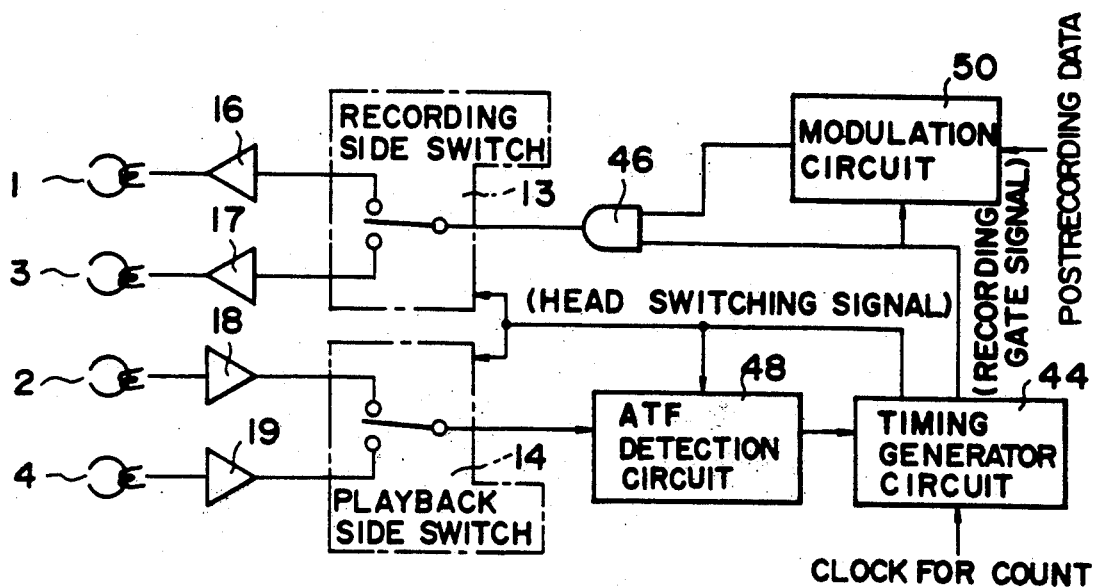
FIG. 4 is a circuit diagram showing a signal processing circuit for determining postrecording timing the preferred embodiment according to the present invention.
Figure 5:
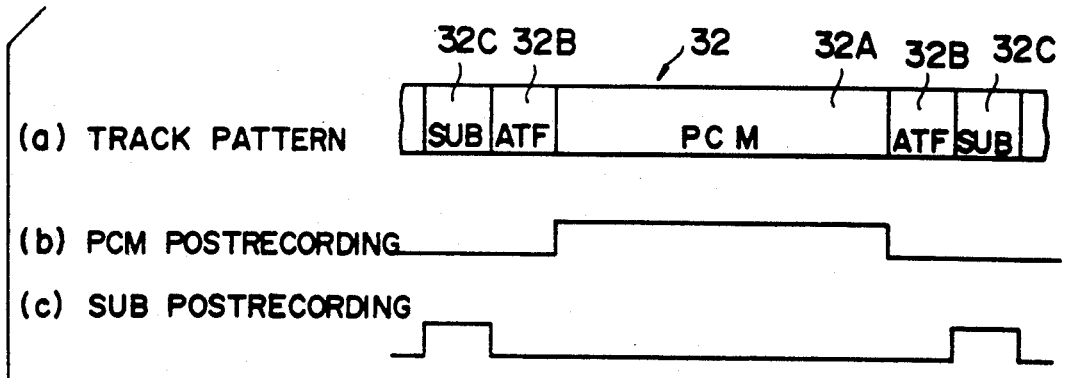
FIG. 5 is a time chart showing the postrecording timings for a track pattern in the preferred embodiment of this invention.

It is to be noted that this invention is not limited to the above embodiment by any means, but it is extremely easy to make design changes of the circuit arrangement shown in FIG. 4 so that the same effects as above are attained, and the present invention therefore includes such alternatives. In addition, this invention may be also applied to magnetic recording and playback apparatus of other rotary head types.

What is claimed is:

1. In a rotary head type magnetic recording and playback apparatus for performing an after recording only on a desired signal area of a recorded magnetic tape having a track width and which is moved in a desired direction, the after recording being performed by head means having a core width greater than the track width of the recorded tape and the desired signal area being one portion of the track, the improvement comprising:

a rotatable drum;
   recording head means and playback head means on said drum;
   said respective head means being mounted on said drum at an angular interval of 90 degrees relative to each other so that said playback head means precede said recording head means in a rotational direction of said drum in a plane of rotation thereof;
   said respective head means being mounted offset relative to each other in the axial direction of the rotational axis of said drum so that a side edge of said recording head means traces the boundary portion between adjacent tracks and a center of said playback head means traces the central portion of one of said adjacent tracks;
   pulley means for guiding said magnetic tape onto substantially 90 degrees of the surface of said rotary drum so that said playback head means and said recording head means alternatively perform playback and recording, respectively;
   said recording head means comprising two recording heads for first and second channels provided at positions angularly spaced relative to each other by 180 degrees, respectively, and having azimuth angles different from each other;
   said playback head means comprising two playback heads for said first and second channels provided at positions angularly spaced relative to each other by 180 degrees, respectively, and having azimuth angles different from each other;
   said first channel recording head, said second channel playback head, said second channel recording head, and said first channel playback head being arranged in said recited order along the outer peripheral surface of said drum in a direction opposite to said rotational direction thereof and at angular intervals of substantially 90 degrees;
   said recorded magnetic tape having recorded on a track thereof at least one auto track finding (ATF) area having a portion containing SYNC signals and a pulse code modulation area;
   first and second recording amplifiers having respective outputs respectively connected to said first and second recording heads;
   first and second playback amplifiers having respective inputs respectively connected to said first and second playback heads;
   first and second switching circuits for selectively switching between said first and second recording amplifiers and said first and second playback amplifiers, respectively;
   an auto (ATF) track finding detection circuit having an input connected to the outputs of said playback amplifiers through said second switching circuit for detecting said ATF and outputting a discrimination signal which discriminates a pulse code modulation area on the basis of a SYNC signal of an output signal of said second switching circuit;
   a timing generator circuit having an input connected to an output of said ATF detection circuit for outputting a recording gate signal to said first and second switching circuits in response to said discrimination signal;
   a modulation circuit having an input connected to an output of said timing generator circuit for receiving said recording gate signal; and
   a further input for post recording data and an output for outputting a modulation signal to said inputs of said recording amplifiers through said first switching circuit.

* * * * *